US007437125B2

(12) United States Patent
McLain et al.

(10) Patent No.: US 7,437,125 B2
(45) Date of Patent: Oct. 14, 2008

(54) EIRP STATISTICAL CALCULATION METHOD

(75) Inventors: Christopher J. McLain, Seattle, WA (US); John R. Palmer, Seattle, WA (US)

(73) Assignee: The Boeing Company, Chicago, IL (US)

(*) Notice: Subject to any disclaimer, the term of this patent is extended or adjusted under 35 U.S.C. 154(b) by 1882 days.

(21) Appl. No.: 10/004,959

(22) Filed: Dec. 4, 2001

(65) Prior Publication Data

US 2002/0144272 A1    Oct. 3, 2002

Related U.S. Application Data

(60) Provisional application No. 60/271,797, filed on Feb. 27, 2001.

(51) Int. Cl.
*H04B 7/185* (2006.01)
*H04Q 7/20* (2006.01)
(52) U.S. Cl. .................. 455/13.4; 455/522; 455/427
(58) Field of Classification Search ............... 455/13.4, 455/522, 427
See application file for complete search history.

(56) References Cited

U.S. PATENT DOCUMENTS 5,924,015 A * 7/1999 Garrison et al. ............ 455/13.4

FOREIGN PATENT DOCUMENTS

EP          0 805 586       11/1997

OTHER PUBLICATIONS

Itu, Methogology for The Calculation of Aggregate Effective Isotropic Radiated Power (A-EIRP) From Stations of The High Density Fixed servie Operating in Bands around 43 GHz, Oct. 2001.*
Monte Carlo Analysis of Satellite Beam Pointing Errors, Journal of Guidance Control and Dyanmics, Jan./Feb. (1992).
PCT International Search Report.
International Telecommunication Union, Radio Communication Study Groups, Resolution 216, May 18, 2001.
International Telecommunication Union, Radio Communication Study Groups, Resolution 216, Sep. 26, 2001.
International Telecommunication Union, Radio Communication Study Groups, Resolution 216, Oct. 18, 2001.

* cited by examiner

*Primary Examiner*—Yuwen Pan
(74) *Attorney, Agent, or Firm*—Harness, Dickey & Pierce, P.L.C.

(57) ABSTRACT

In a system for providing data content to and from a plurality of mobile platforms where each of the mobile platforms transmits a return link having an EIRP to a predetermined location via a satellite-mounted transponder, a method for controlling an EIRP of the aggregate return link emissions of the mobile platforms. The method includes the steps of determining a probability distribution of the EIRP of the return link for each of the mobile platforms; and determining a probability distribution of the EIRP for the aggregate return link emissions using the probability distributions of the EIRP of the return link for each of the mobile platforms; determining an aggregate off-axis EIRP density envelope for a predetermined probability level and the probability distribution of the EIRP for the aggregate return link emissions.

20 Claims, 4 Drawing Sheets

EIRP STATISTICAL CALCULATION METHOD

This application claims the benefit of U.S. Provisional Application No. 60/271,797 filed Feb. 27, 2001.

FIELD OF THE INVENTION

The present invention relates generally to worldwide systems for supplying live television programming and bi-directional data services to mobile platforms, such as aircraft, using satellite communication. More particularly, the present invention relates to network control of aggregate emissions to protect co-frequency fixed satellite service (FSS) systems from interference while providing improved data transmission capacity through the accurate accounting of errors in the off-axis EIRP density calculation.

BACKGROUND OF THE INVENTION

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

Co-pending and commonly assigned U.S. patent application Ser. No. 09/639,912 entitled "Method and Apparatus for Providing Bi-Directional Data Services and Live Television Programming to Mobile Platforms", the disclosure of which is hereby incorporated by reference as if fully set forth herein, discloses one system for providing live television programming and bi-directional data communication to users onboard mobile platforms via one or more satellite links.

Network control of aggregate emissions is a key feature of the system as it permits the system to protect co-frequency fixed satellite service (FSS) systems from interference. More specifically, the system is responsible for managing the aggregate effective isotropic radiated power (EIRP) emissions of the airborne terminals that share a FSS transponder so as to maintain the aggregate EIRP emissions within a predetermined envelope of technical and operating parameters for a given FSS satellite to thereby meet the licensing requirements of the regulatory agencies (e.g., the FCC and the ITU) that oversee communication via FSS satellite stations. Network control of aggregate emissions is typically accomplished by controlling entry into the system and changes in the aircraft data rates.

In accurately managing the aggregate EIRP emissions, the off-axis EIRP pattern for each mobile platform, as well as the aggregate transmission of all mobile platforms, must be accurately modeled. The accuracy of the model is limited by errors that include, for example, mobile platform pointing errors, power control errors and the accuracy of the mobile platform antenna models. As discussed hereinafter, the exemplary mobile platform that will be used for purposes of discussion will be an aircraft. Those skilled in the art will understand, however, that the mobile platform may also be a ship, train, automobile or any type of vehicle.

The most direct method for accounting for errors in the off-axis EIRP density calculation is to hold a fixed margin for each error that provides a high probability of attainment (e.g., 99.7%). For example, a pointing error margin is established by determining the maximum change in off-axis EIRP density that results from a 99.7% probability error. As the change in the off-axis EIRP density is sensitive to the position and attitude (e.g., heading, pitch, roll) of the aircraft, the pointing error margin is computed for the worst-case location and attitude. Margins for every other error source in the EIRP density calculation are computed in a similar fashion that is based on a worst-case scenario, and then summed to provide a total margin. The off-axis EIRP density without errors is next computed for each transmitter, and the contributions of each transmitted are summed for the transponder along with the total margin. The resultant sum is then compared to a predetermined limit.

This method has several drawbacks that largely stem from the use of a worst-case scenario approach. Margins that are based on a worst-case location and attitude tend to be larger than necessary during the times at which the aircraft is not operating at the worst-case location and attitude, resulting in an artificially high error calculation that effectively decreases transponder capacity.

Summing the individual errors that were calculated on the basis of a worst-case scenario tends to produce a total error for each mobile platform that is larger than necessary, since it is unlikely that all of the potential errors would be in their worst-case condition simultaneously. Further, when more than one mobile platform shares a transponder, it is unlikely that errors for each of the multiple mobile platforms that are using the transponder would simultaneously be operating at their extreme values. Accordingly, when the conservative fixed error rates that are based on worst-case scenarios are repetitively overlaid onto the system (with each overlayment representing one of the mobile platforms), the error rate of the system is tremendously inflated, resulting in significant decreases to transponder capacity.

Another drawback with the use of fixed margins is that they tend to negate the impact of technological improvements to the system, which reduce errors. For example, the fixed margins are typically computed based on a specific type of terminal. Assuming that this terminal has a relatively high set of error characteristics, any terminal operating in the system having a relatively lower set of error characteristics is in effect penalized since the system cannot account for the fraction of the population of terminals that has better error characteristics. Again, this results in an artificially high error calculation that effectively decreases transponder capacity.

Accordingly, there remains a need in the art for an improved method of controlling the aggregate emissions of a system for providing bi-directional data services to mobile platforms, wherein the system employs an improved method for calculating the aggregate off-axis EIRP density envelope for the system, and wherein an improved method is employed for accounting for errors in the off-axis EIRP density calculation.

SUMMARY OF THE INVENTION

In one preferred form, the present invention provides a method for controlling the EIRP of the aggregate return link emissions of a system that provides data content to and from a plurality of mobile platforms. Each of the mobile platforms transmits a return link having an EIRP to a predetermined location via a satellite-mounted transponder. The method includes the steps of determining a probability distribution of the EIRP of the return link for each of the mobile platforms; determining a probability distribution of the EIRP for the aggregate return link emissions using the probability distributions of the EIRP of the return link for each of the mobile platforms; and determining an aggregate off-axis EIRP density envelope for a predetermined probability level and the probability distribution of the EIRP for the aggregate return link emissions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
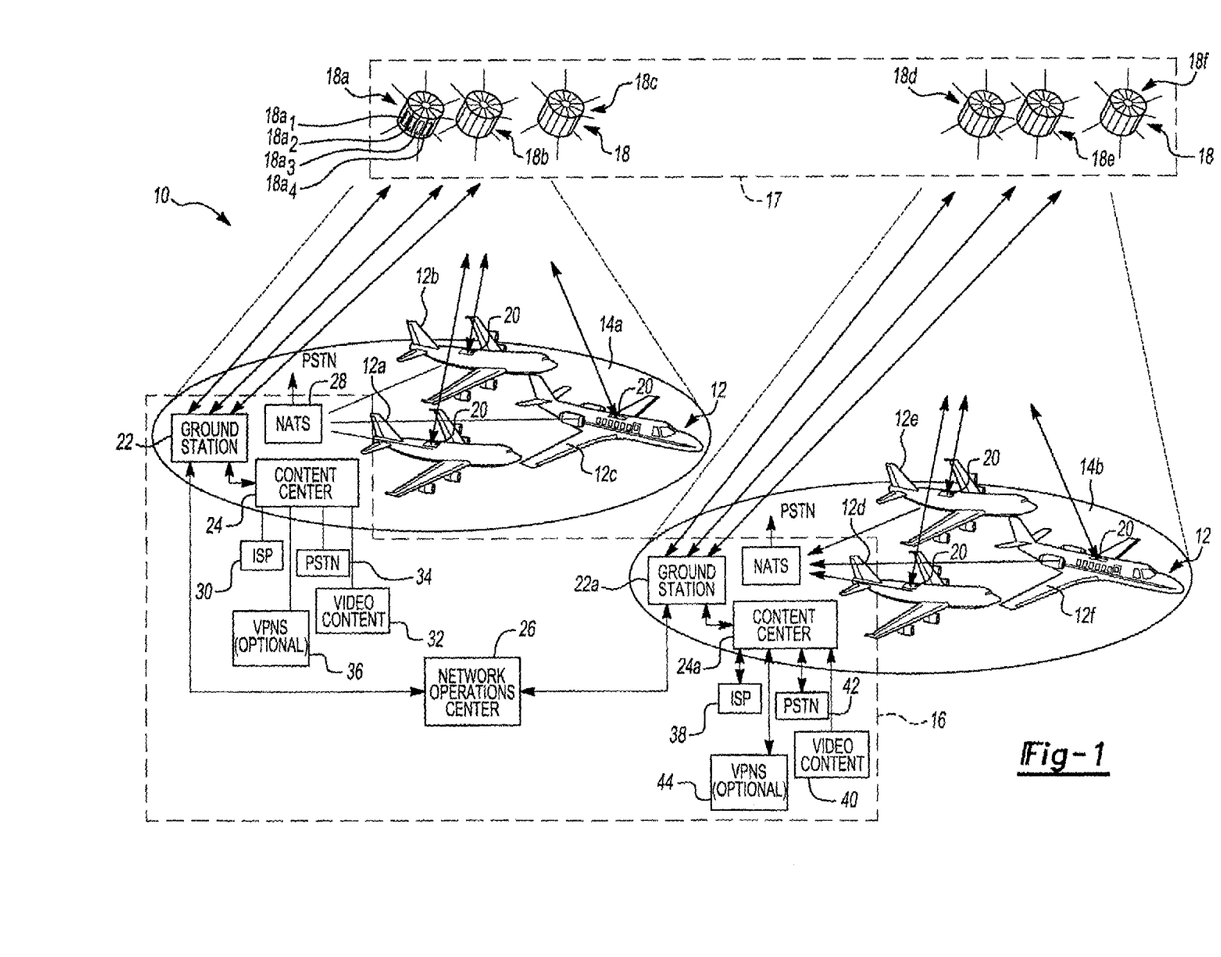
FIG. 1 is a simplified block diagram drawing illustrating a system for providing data content to a plurality of moving platforms that employs the methodology of the present invention.

Referring to FIG. 1, there is shown a system 10 in accordance with a preferred embodiment of the present invention for providing data content to and from a plurality of moving platforms 12a-12f in one or more distinct coverage regions 14a and 14b. The system 10 generally comprises a ground segment 16, a plurality of satellites 18a-18f forming a space segment 17, and a mobile system 20 disposed on each moving platform 12. The moving platforms 12 could comprise aircraft, cruise ships or any other moving vehicle and thus, the illustration of the moving platforms 12 as aircraft in the figures herein, and the reference to the mobile platforms as aircraft throughout the following description is merely exemplary and should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 is further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$-$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$-$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d-18f occur in coverage region 14b. It will also be understood that the invention may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$-$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b, including the possibility of overlap between coverage areas 14a and 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. The content center 24 may also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 24 performs traditional network management, user authentication, accounting, customer service and billing tasks. The content center 24a associated with the ground station 22a in the second coverage region 14b would also preferably be in communication with an ISP 38, a video content provider 40, a PSTN 42, and if desired, a VPN 44. An optional air telephone system 28 may also be included as an alternative to the satellite return link.

Figure 2:
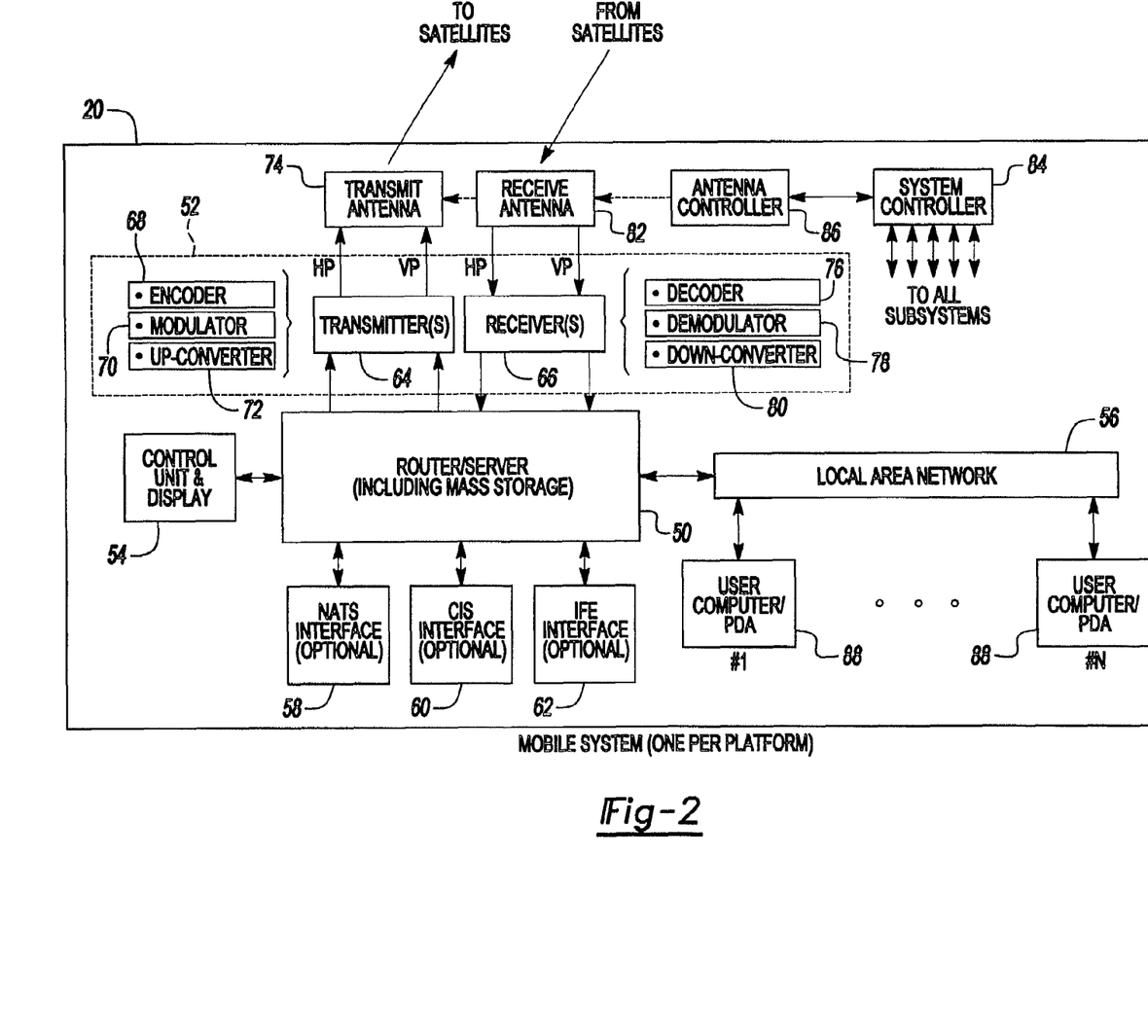
FIG. 2 is a block diagram of the mobile system carried on each mobile platform.

Referring now to FIG. 2, the mobile system 20 disposed on each aircraft 18 will be described in greater detail. Each mobile system 20 includes a data content management system in the form of a router/server 50 (hereinafter "server") that is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are utilized, then a corresponding plurality of components 76-80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Company, the disclosure of which is hereby incorporated by reference as if fully set forth herein.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission and identified by reference letter F. IP packet multiplexing is also preferably employed such that data content can be provided simultaneously to each of the aircraft 12 operating within the coverage region 14a using unicast, multicast and broadcast transmissions.

The IP data content packets in the forward links F that received by each of the transponders $18a_1$-$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 18. The receive antenna 74 of each aircraft receives the entire RF transmission of encoded RF signals representing the IP data content packets in the forward link F from at least one of the transponders $18a_1$-$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$-$18a_4$ carried by the target satellite 18 to which it is pointed. The receiver 66 decodes, demodulates and down-converts the encoded RF signals in the forward link F to produce video and audio signals, as well as data signals, that are input to the server 50. The server operates to filter off and discard any data content not intended for users on the aircraft 18 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

An advantage of the system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using private portal data content. This is implemented as a set of HTML pages housed on the server 50 of each mobile system 20. The content is kept fresh by periodically sending updated portions from a ground-based server located in content center 24, and in accordance with a scheduling function controlled by the NOC 26 of the ground segment 16. The server 50 can readily be configured to accept user log-on information to support authentication and authorization of users and to keep track of user and network accounting information to support a billing system. The authorization and accounting systems can be configured to communicate with the ground segment 16 to transfer accumulated data at convenient intervals to the NOC 26.

The system 10 of the present invention also provides direct Internet connectivity via satellite links for a variety of purposes, such as when a user on board the aircraft 12 desires to obtain data content that is not cached on server 50, or as an avenue for content sources to provide fresh content for the private portals. The server may be used to cache the most frequently requested web pages as well as to host a domain name system (DMS) look-up table of the most frequently accessed domains. The DMS look-up table is preferably maintained by the content center 24 and is periodically updated on the mobile system 20. Refreshing of the cached content of the portal may be accomplished by in-flight, periodic "pushed" cache refresh or at the gate of an airport terminal using any form of wired or wireless connection to the aircraft 18, or via a manual cache refresh by a crew member of the aircraft 12 carrying on board a CD ROM and inserting it into the cache server. The system 10 implements the in-flight periodic, pushed cache refresh updates over the satellite links. Preferably, refreshing of the cache content occurs during periods of low demand on the satellite links.

Referring further to FIG. 1, a transmission of data content from the aircraft 12a to the ground station 22 will be described. This transmission is termed a "return link" transmission and is designated by reference letter R. The antenna controller 86 causes the transmit antenna 74 to maintain the antenna beam thereof pointed at the target satellite 18a. The channels used for communication from each mobile system 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder $18a_1$-$18a_4$ carried by a given satellite 18. The preferred multiple access methods for the return link R are code division multiple access (CDMA), frequency divisional multiple access (FDMA), time division multiple access (TDMA) or combinations thereof. Thus, multiple mobile systems 20 may be assigned to a single transponder $18a_1$-$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. Initial acquisition of the satellite by the receive antenna 82 is accomplished through the use of the aircraft navigation data. An alternative implementation could use an open-loop tracking method with the pointing direction and polarization determined by knowledge of mobile platform position and attitude using an on-board inertial reference unit (IRU) and knowledge of the location of the satellites 18.

During normal operation, the receive antenna 82 dwells at a predetermined number of points, such as five points, (sequential lobing) about the estimated vector between the mobile platform 20 and the satellite 18 and using the strength measurements of the forward link F for each of these points, a true satellite vector is calculated. The receive antenna 82 preferably performs this operation about 50 times per second and can accurately point to the satellite 18 even during extreme movements of the mobile platform 20.

Encoded RF signals that comprise the return link R are transmitted from the transmit antenna 74 of the mobile system 20 of a given aircraft 12 to an assigned one of the transponders $18a_1$-$18a_4$, and transponded by the designated transponder to the ground station 22. The ground station 22 communicates with the content center 24 to determine and provide the appropriate data being requested by the user (e.g., content from the world wide web, email or information from the user's VPN).

It is important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74 used with the present invention, in some instances, may create an antenna beam that is wide enough to irradiate satellites that are adjacent to the target satellite along the geosynchronous arc, which could create an interference problem. This potential problem is eliminated by employing spread spectrum modulation techniques on the return link transmissions as well. The transmitted signal from the transmit antenna 74 (i.e., the return link R) is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

As noted above, network control of aggregate emissions is a key feature of the system 10 as it permits the system 10 to protect the satellites 18 from interference. The NOC 26 is operable for managing the EIRP emissions of the mobile platforms 20 (i.e., the aggregate emissions of all the mobile platforms 20) that share a transponder $18a$, -$18a_4$ carried by a given satellite 18. The degree to which the NOC 26 manages the aggregate emissions is settable to meet the licensing requirements of the various regulatory agencies, such as the FCC or the ITU.

Figure 3:
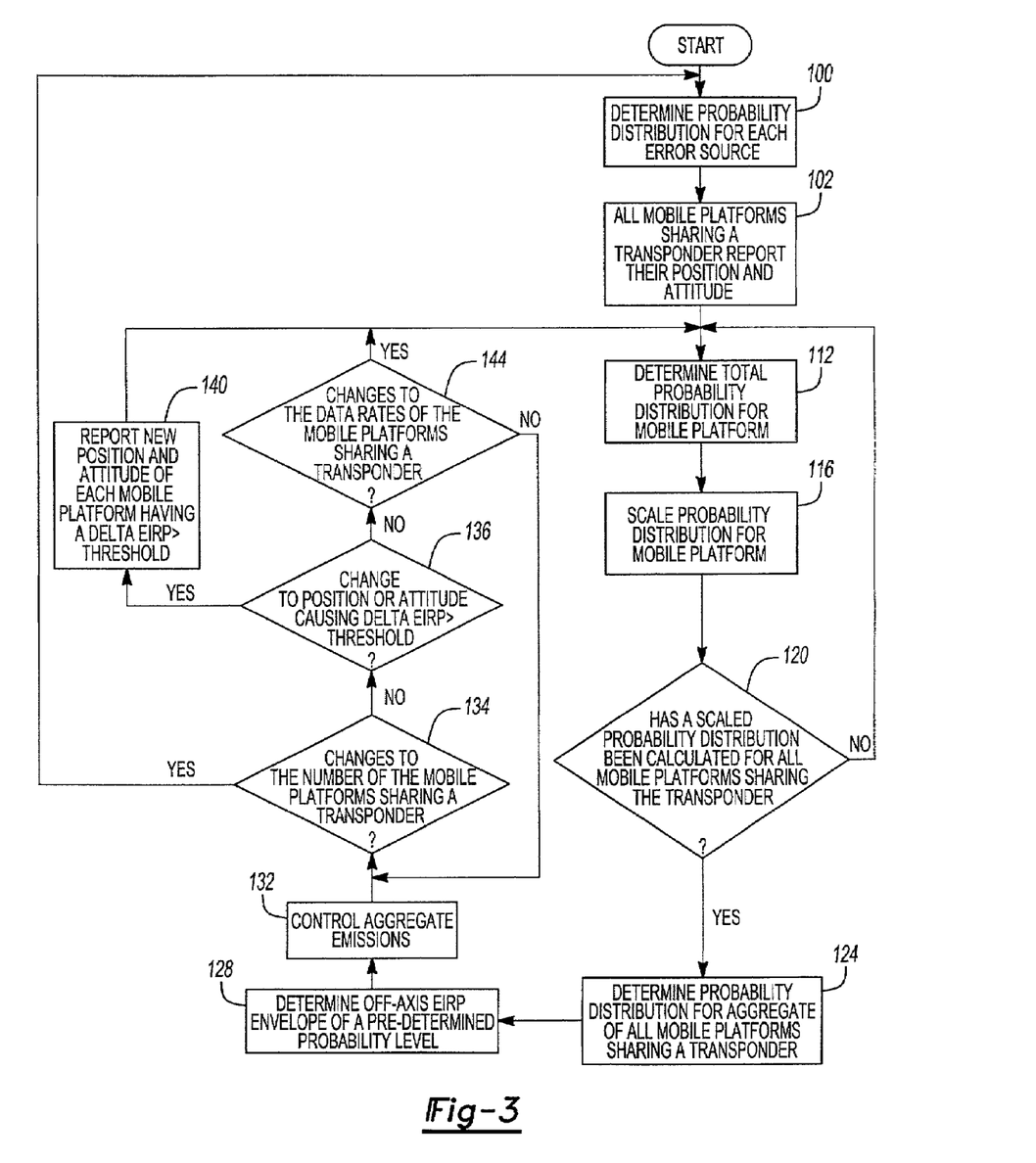
FIG. 3 is a schematic illustration in flowchart form of the methodology of the present invention.

With reference to FIG. 3, the management of the aggregate return link emissions (i.e., the aggregate of the return links Ra and Rb shown in FIG. 4) is schematically illustrated in flowchart form. The methodology begins at the bubble labeled "START" and proceeds to block 100 where the probability distribution functions of each error source in the system 10 is determined. The distribution of each error source can be determined using analysis of the system 10 or testing of each of the system's components. For example, pointing error could be determined by simulating the pointing loop or, more preferably, by measuring the pointing error of an antenna on a motion platform in a test range. The probability distributions can be described either numerically, an example of which is a table that details the probability density versus error, or analytically, an example of which is a standard deviation for an error source with an analytically fit distribution that may be a simple normal distribution or a more complex distribution.

Figure 4:
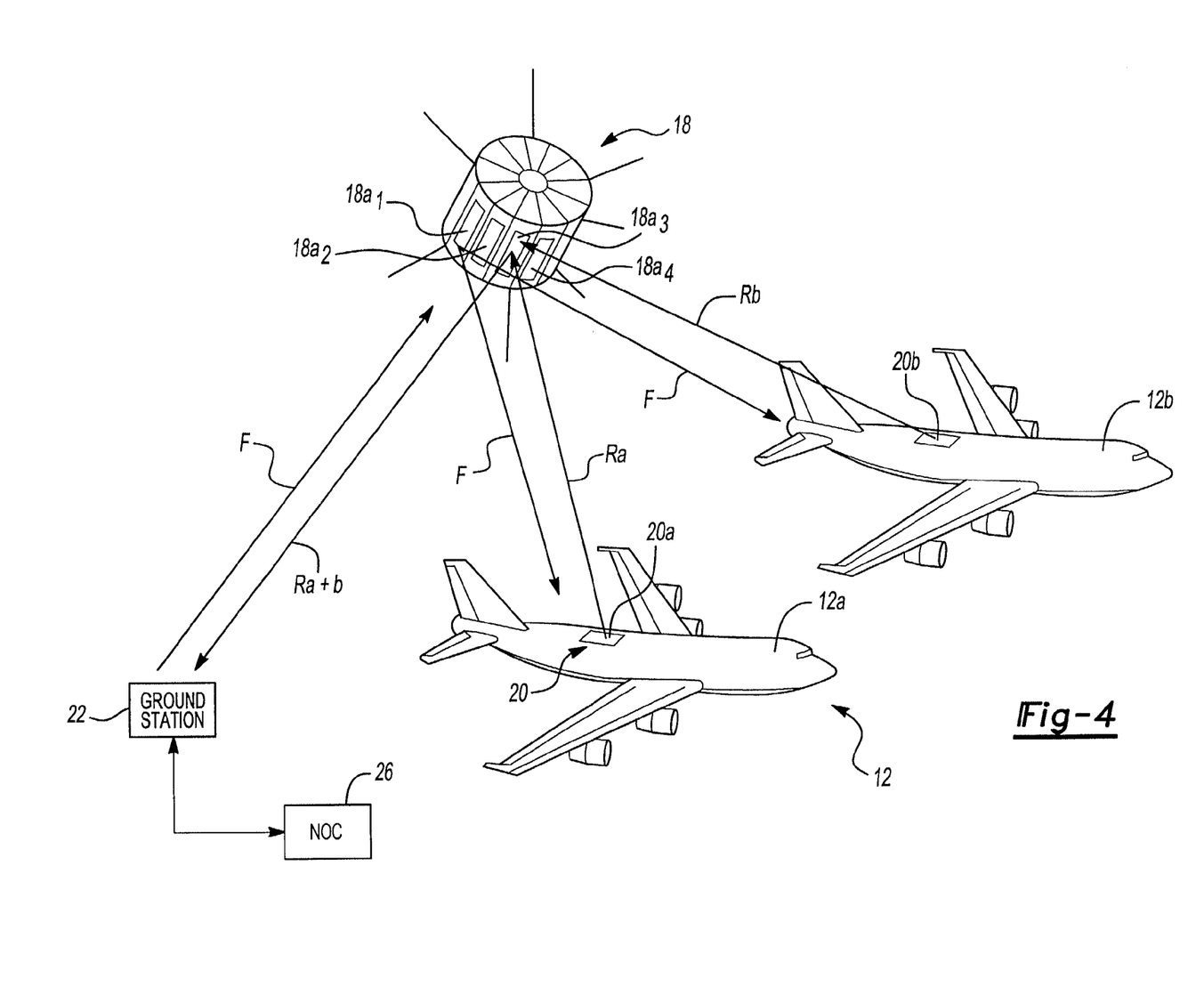
FIG. 4 is an enlarged portion of the system of FIG. 1.

Once the probability distribution functions have been determined for each error source in the system, the methodology proceeds to block 102 where, with additional reference to FIG. 4, each of the mobile platforms 20 (e.g., mobile platforms 20a and 20b) that is sharing a transponder (e.g., 18$a_3$) reports its position and attitude to the NOC 26. The methodology then proceeds to block 112.

In block 112, the NOC 26 computes the total probability distribution for the mobile platform 20a. In the preferred embodiment of the present invention, the probability distribution for the off-axis points of the mobile platform 20a is determined numerically using Monte Carlo trials. Numerical implementation is preferred as it simplifies the calculation of the probability density of the off-axis EIRP density resulting from errors that are non-linearly related to off-axis EIRP, such as pointing error. Each Monte Carlo trial computes the antenna beam pattern for the location and attitude of the mobile platform 20a, with errors resulting from random calls to the previously defined error probability distributions. For example, the pattern produced by each trial includes a randomly generated amount of pointing error associated with the pointing error distribution. By using the current location and attitude of the mobile platform 20a, the sensitivity of that location and attitude to pointing errors is automatically captured in the computation of the total probability distribution for the mobile platform 20a. The number of Monte Carlo trials is a design parameter that can be set to optimize computational execution time versus the reliability of the algorithm; in practice, a value corresponding to 30 trials has proven sufficient.

Alternately, the probability distribution in block 112 for the off-axis points of the mobile platform 20a may be determined analytically. If the error distributions are provided in analytical form, the probability distribution for the mobile platform 20a is given by the convolution of the individual error distributions according to the following equation:

$$f_{Sum}(y) = \int_{-\infty}^{\infty} f_1(y-x) f_2(x) dx$$

where $f_{Sum}(y)$ is the probability distribution for the mobile platform 20a, the variable $f_1(y-x)$ is the function that describes a single given error source and the variable $f_2(x)$ is a distribution that corresponds to a second error source. Each additional error source (e.g., $f_n(x)$) is convolved with $f_{Sum}(y)$ using the same equation. In the event that each of the individual error distributions have a normal distribution, the above equation reduces to the following:

$$\sigma_{Sum} = \sqrt{\sigma_1^2 + \sigma_2^2 + ... + \sigma_n^2}$$

where $\sigma_{Sum}$ is the probability distribution for the mobile platform 20a and each of the variables $\sigma_1, \sigma_2 ...$ and $\sigma_n$ represents a corresponding one of the individual error distributions.

Once the total probability distribution for the mobile platform 20a has been calculated in block 112, the methodology proceeds to block 116 where the total probability distribution for the mobile platform 20a is scaled by the mobile plafform's peak EIRP. The peak EIRP density directed at a target satellite 18 is calculated separately, based on the characteristics of the communication link and the data rate of the mobile platform 20a. The peak EIRP density directed at a target satellite 18 is then employed to calculate a scaling fraction that is equal to the actual EIRP divided by the peak EIRP. Preferably, each of the Monte Carlo trial beam patterns determined in block 112 is multiplied by the scaling fraction to produce the off-axis EIRP density contribution of the mobile platform 20a. The methodology then proceeds to decision block 120.

In decision block 120, the NOC 26 determines whether a scaled total probability distribution has been calculated for each of the mobile platforms 20 that is sharing a transponder 18a. If a transponder 18a is being shared by more than one mobile platform 20, the methodology loops back to block 112 and performs this portion of the methodology for each mobile platform 20 that is sharing a transponder 18a. Once the scaled total probability distributions have been calculated for each of the mobile platforms 20 that is sharing a transponder 18a, the methodology will proceed to block 124. In the example illustrated in FIG. 4, two mobile platforms 20a and 20b are sharing the transponder 18$a_3$, and as such, the methodology will loop back to block 112 to permit the methodology to calculated the scaled total probability distribution for mobile platform 20b. Thereafter, the methodology will proceed to block 124.

In block 124, the methodology determines the probability distribution for the aggregate of mobile platforms 20 sharing a transponder 18a. If a transponder 18a is being utilized by only one mobile platform 20, the probability distribution for the aggregate is equal to the scaled total probability distribution for the mobile platform 20. When a transponder 18a is being shared, however, the scaled Monte Carlo trials in block 116 are summed to produce the same number of trials for the aggregate off-axis EIRP density. Any error sources that apply only to the entire aggregate are applied numerically the to the aggregate trials. Using these trials, estimates for the mean value (μ) and the standard deviation (σ) of the aggregate are computed for each point. In a preferred embodiment, the probability distribution for the aggregate is assumed to be normal. Other probability distributions, however, may also be employed, such as a log-normal distribution, depending on the distribution of the constituent error sources.

Alternatively, in block 124, the analytical expressions for the combined errors of each mobile platform 20 may be themselves convolved to arrive at an expression for the aggregate of the mobile platforms 20 that are sharing a transponder 18a. Error sources that apply only to the entire aggregate can be further convolved with the analytical probability distributions for each of the mobile platforms 20 that are sharing the transponder 18a.

The methodology next proceeds to block 128 where the methodology determines the aggregate off-axis EIRP density envelope for a given probability level. In a preferred embodiment, the aggregate off-axis EIRP density envelope is calculated at every point along the GSO by the equation:

$$EIRP = \mu + (N)(\sigma)$$

where μ is the estimate for the mean value of the aggregate of mobile platforms 20 sharing a transponder 18a, N is a predetermined value that determines the desired probability level of the envelope and a is the estimate of the standard deviation of the aggregate of mobile platforms 20 sharing a transponder 18a. Preferably, the desired probability level of the envelope is at least about 99.7% and more preferably at least 99.9%. To the degree that the total probability distribution for the mobile platform 20a in block 112 and the probability distribution for the aggregate of mobile platforms 20 sharing a transponder 18a in block 124 has been accurately modeled, and that a normal distribution accurately approximates the aggregate EIRP density probability, the value of N corresponds to the probability level associated with the number of standard deviations above the mean of the EIRP envelope. For example, if N were to be set equal to 3, the method will yield a distribution envelope having approximately a 99.7% probability (i.e., the actual EIRP density would fall within the calculated distribution envelope approximately 99.7% of the time). Those skilled in the art will understand that the value of N may have to be varied to achieve a desired confidence level to account for variances from the above-referenced assumptions (i.e., the degree to which the models for the total probability distribution for the mobile platform 20a in block 112 and the probability distribution for the aggregate of mobile platforms 20 sharing a transponder 18a in block 124 are not completely accurate, and the degree to which the distribution of the aggregate EIRP density probability varies from a normal distribution).

Alternatively, the off-axis EIRP envelope can be calculated by integrating the probability density function that is detailed in block 124 to yield the cumulative distribution function for the aggregate. The cumulative distribution function may thereafter be inverted to provide the EIRP envelope as a function of the desired confidence level.

The methodology proceeds to block 132 where the results from block 128 are compared to the applicable regulatory limits and employed to control the mobile platforms 20 (e.g., mobile platforms 20a and 20b) that are sharing the transponder 18a and the data rates from each of the mobile platforms 20 that are sharing the transponder 18a (e.g., mobile platforms 20a and 20b that are sharing transponder $18a_3$) such that the regulatory limits are met.

The methodology then proceeds to decision block 134 where the methodology determines whether one or more mobile platforms 20 that are using the transponder 18a have entered into or left the system 10. If the methodology determines that one or more mobile platforms 20 have entered into or left the system 10 such that the number of mobile platforms 20 that is using the transponder 18a has changed, the methodology loops back to block 100. If the methodology determines that the number of mobile platforms 20 that are using the transponder 18a has remained constant in decision block 134, the methodology will proceed to decision block 136.

In decision block 136 the methodology determines whether changes in the position or attitude of any of the mobile platforms 20 that are sharing the transponder 18a have caused the off-axis EIRP pattern of the mobile platform 20 to change by more than a predetermined threshold amount (e.g., 0.1 dB). If changes in the position or attitude of any mobile platform 20 have changed its off-axis EIRP pattern by more than the predetermined threshold amount, the methodology proceeds to block 140 where those mobile platforms 20 whose off-axis EIRP pattern has changed by more than the predetermined threshold amount as a result of changes to its position or attitude report their new position and attitude to the NOC 26. The methodology then proceeds to block 112.

Returning to decision block 136, if changes in the position or attitude of any of the mobile platforms 20 have not changed their off-axis EIRP pattern by more than the predetermined threshold amount, the methodology proceeds to decision block 144 where the methodology determines whether changes to the data rate of the mobile platforms 20 that are sharing the transponder 18a have changed. If the data rates of any of the mobile platforms 20 that are sharing the transponder 18a have changed, the methodology proceeds to block 112. The methodology will then account for the changes in the data rates, as for example, in block 116 when the probability distributions for the mobile platforms are scaled.

As those skilled in the art will appreciate, positive control of the mobile platforms 20 is essential to maintaining control of aggregate emissions. Accordingly, fault management is included in the system 10 to ensure that no transmissions take place from a mobile platform 20 unless it is under positive control. In this regard, transmission from a mobile platform 20 may be inhibited under the following circumstances: a fault in the transmit antenna 74 or any on-board transmit control system is detected by the built-in test equipment of the on-board transmit control system; communication is lost between the transmitter subsystem 64 and the transmit antenna 74; the mobile platform 20 loses the receive link R; and/or the mobile platform 20 fails to receive a "keep alive" signal from the NOC 26.

Ground based fault detection is also employed by the system 10 in determining whether the mobile platform(s) are under positive control. The ground based fault detection may include, for example: a determination that a return link R has been lost; communication with the NOC 26 has been lost; a determination that a mobile platform 20 has failed to properly respond to power control commands; and/or a determination that a mobile platform 20 has failed to properly respond to a command to change its data rate. In such situations, the "keep alive" signal that is transmitted to the appropriate mobile platform(s) 20 will be withheld to cause the mobile platform (s) to cease transmitting.

In comparison with network control that is based on fixed margins, the present invention permits the capacity of a transponder 18a to be increased via a statistically determined reduction in the margin that has been allocated for various errors within the system 10. As those skilled in the art will understand, the sharing of a transponder 18a by multiple mobile platforms 20 will result in further increases to the capacity of the transponder 18a as compared with network control based on fixed margins. As each transponder 18a can cost upwards of $2 million per year to lease, the present invention reduces the overall operating cost of the system 10 by reducing the number of transponders 18a that are needed to provide the same amount of capacity for the return links R of each of the mobile platforms 20.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. In a system for providing data content to and from a plurality of mobile platforms, each of the mobile platforms transmitting a return link emission having an effective isotropic radiated power (EIRP) to a predetermined location via a satellite-mounted transponder, a method for controlling an EIRP of the aggregate return link emissions of the mobile platforms, the method comprising the operations of:

determining a probability distribution of the EIRP of the return link emission for each of the mobile platforms;

determining a probability distribution of the EIRP for the aggregate return link emissions using the probability distributions of the EIRP of the return link emission for each of the mobile platforms; and determining an aggregate off-axis EIRP density envelope for a predetermined probability level and the probability distribution of the EIRP for the aggregate return link emissions.

2. The method of claim 1, wherein the probability distribution of the EIRP for at least one return link emission is determined numerically.

3. The method of claim 2, wherein a plurality of Monte Carlo trials are employed to numerically determine the probability distribution of the EIRP of the at least one return link emission.

4. The method of claim 3, wherein 30 Monte Carlo trials are employed to numerically determine the probability distribution of the EIRP of the at least one return link emission.

5. The method of claim 1, wherein the probability distribution of the EIRP for at least one return link emission from one of said mobile platforms is determined analytically.

6. The method of claim 5, further comprising assuming that each error source present in the system is normal and has a probability distribution that is the square root of the sum of the squares of each of a plurality of individual error distributions.

7. The method of claim 1, wherein the operation of determining a probability distribution of the EIRP for the aggregate return link emissions includes the operation of scaling each of the EIRP of the return link probability distributions by a scaling fraction that is equal to the actual EIRP of the return link divided by the peak EIRP of the return link.

8. The method of claim 1, wherein the operation of determining the probability distribution of the aggregate off-axis EIRP density envelope includes the steps of:

determining a mean value of the aggregate off-axis EIRP probability;

determining a standard deviation of the aggregate off-axis EIRP probability; and calculating a probability distribution of the aggregate off-axis EIRP density envelope by adding the mean value to the product of the standard deviation and a predetermined value that is associated with the predetermined probability level.

9. The method of claim 1, wherein the predetermined probability level is at least 99.7%.

10. The method of claim 9, wherein the predetermined probability level is at least 99.9%.

11. The method of claim 1, further comprising the operation of controlling the mobile platforms such that the EIRP of the aggregate return link emissions is within the aggregate off-axis EIRP density envelope at the predetermined probability level.

12. In a system for providing data content to and from a plurality of mobile platforms, each of the mobile platforms transmitting a return link emission having an EIRP to a predetermined location via a satellite-mounted transponder, a method for controlling an effective isotropic radiated power (EIRP) of the aggregate return link emissions of the mobile platforms, the method comprising the operations of:

determining a probability distribution of the EIRP of the return link emission for each of the mobile platforms;

scaling each of the EIRP of the return link emission probability distributions by a scaling fraction that is equal to the actual EIRP of the return link emission divided by the peak EIRP of the return link emission;

determining a probability distribution of the EIRP for the aggregate return link emissions using the probability distributions of the EIRP of the return link emission for each of the mobile platforms;

determining an aggregate off-axis EIRP density envelope for a predetermined probability level and the probability distribution of the EIRP for the aggregate return link emissions; and controlling the mobile platforms such that the EIRP of the aggregate return link emissions is within the aggregate off-axis EIRP density envelope at the predetermined probability level.

13. The method of claim 12, wherein a plurality of Monte Carlo trials are employed to numerically determine the probability distribution of the EIRP of at least one said return link emission from one of said mobile platforms.

14. The method of claim 13, wherein about 30 Monte Carlo trials are employed to numerically determine the probability distribution of the EIRP of the at least one return link emission.

15. The method of claim 12, wherein the operation of determining the probability distribution of the aggregate off-axis EIRP density envelope includes the operations of:

determining a mean value of the aggregate off-axis EIRP probability;

determining a standard deviation of the aggregate off-axis EIRP probability; and calculating the probability distribution of the aggregate off-axis EIRP density envelope by adding the mean value to the product of the standard deviation and a predetermined value that is associated with the predetermined probability level.

16. The method of claim 12, wherein the operation of determining the probability distribution of the aggregate off-axis EIRP density envelope includes the operations of:

determining a mean value of the aggregate off-axis EIRP probability;

determining a standard deviation of the aggregate off-axis EIRP probability; and calculating the probability distribution of the aggregate off-axis EIRP density envelope by adding the mean value to the product of the standard deviation and a predetermined value that is associated with the predetermined probability level.

17. The method of claim 12, wherein the predetermined probability level is at least 99.7%.

18. The method of claim 17, wherein the predetermined probability level is at least 99.9%.

19. In a system for providing data content to and from a plurality of mobile platforms, each of the mobile platforms transmitting a return link having an effective isotropic radiated power (EIRP) to a predetermined location via a satellite-mounted transponder, a method for controlling an EIRP of the aggregate return link emissions of the mobile platforms, the method comprising the operations of:

determining a probability distribution of the EIRP of the return link emission for each of the mobile platforms, each of the probability distributions being determined numerically through a plurality of Monte Carlo trials;

scaling each of the EIRP of the return link probability distributions by a scaling fraction that is equal to the actual EIRP of the return link emission divided by the peak EIRP of the return link emission;

determining a probability distribution of the EIRP for the aggregate return link emissions using the probability distributions of the EIRP of the return link emission for each of the mobile platforms;

determining a mean value of the aggregate off-axis EIRP probability;

determining a standard deviation of the aggregate off-axis ERR probability;

calculating a probability distribution of an aggregate off-axis EIRP density envelope by adding the mean value to the product of the standard deviation and a predetermined value that is associated with a predetermined probability level; and controlling the mobile platforms such that the EIRP of the aggregate return link emissions is within the aggregate off-axis EIRP density envelope at the predetermined probability level.

20. The method of claim 19, wherein the predetermined probability level is at least 99.7%.

* * * * *